(No Model.)
J. N. RICHEY, S. N. HENCH & W. A. DROMGOLD.
SAWMILL DOG.
No. 488,906. Patented Dec. 27, 1892.
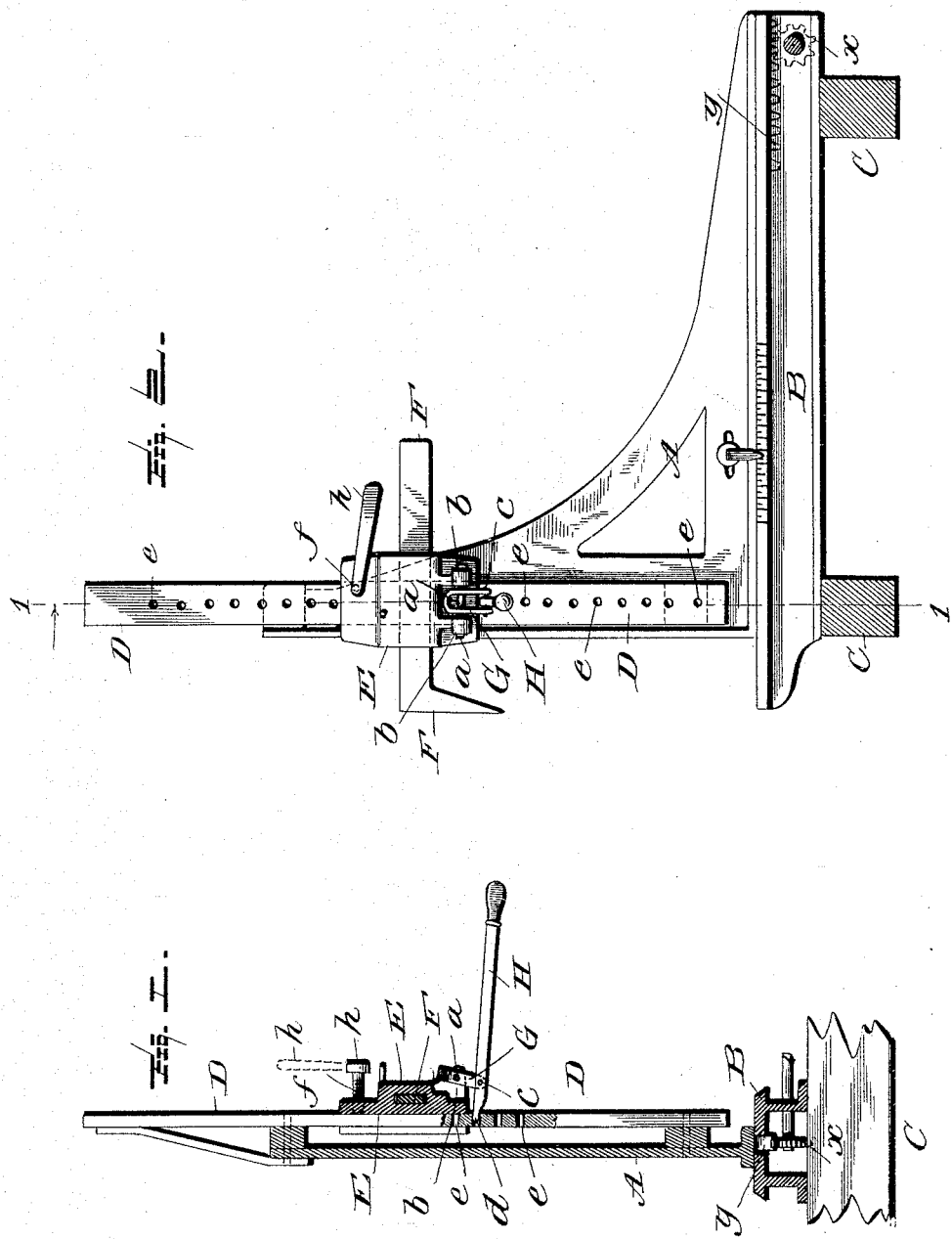
Witnesses
L. C. Hills
Evle A. Dick
Inventors
James N. Richey.
Samuel N. Hench.
Walker A. Dromgold.
By Marcellus Bailey
Their Attorney

UNITED STATES PATENT OFFICE.

JAMES N. RICHEY, OF CARMICHAEL'S, AND SAMUEL N. HENCH AND WALKER A. DROMGOLD, OF YORK, PENNSYLVANIA; SAID RICHEY ASSIGNOR TO SAID HENCH AND DROMGOLD.

SAWMILL-DOG.

SPECIFICATION forming part of Letters Patent No. 488,906, dated December 27, 1892.

Application filed August 2, 1892. Serial No. 441,926. (No model.)

*To all whom it may concern:*

Be it known that we, JAMES N. RICHEY, of Carmichael's, Green county, and SAMUEL N. HENCH and WALKER A. DROMGOLD, of York, State of Pennsylvania, have invented a certain new and useful Improvement in Sawmill-Dogs, of which the following is a specification.

This improvement has particular reference to means for setting the dog usually carried by the head block into the material to be held by it, and its object is to provide a simple, easily manipulated, efficient and inexpensive mechanism for the purpose. To this end we combine with the head block, the rack bar thereon, the dog, and the dog carrying slide or bracket, a lever to engage the rack bar, which is pivoted in a carrier hung on a pin or pivot in the dog carrying bracket or slide, the arrangement being such that while the lever can vibrate on its pivot independently of its carrier—the carrier may swing upon its own pivotal axis in such manner as to permit both it and the lever which it carries to advance toward and recede from the rack bar. It is this combination which characterizes our invention.

To enable others skilled in the art to understand and use our invention we will now proceed to describe it by reference to the accompanying drawings, in which—

Figure 1 is a sectional elevation on line 1—1, Fig. 2, and Fig. 2 is a side elevation of a head block embodying our improvement.

The head block consists as usual of a knee A held to and adapted to slide back and forth on a base B placed transversely on and secured to the carriage C—this movement of the knee being obtained by an adjusting pinion $x$ gearing with a rack $y$ on the underside of the horizontal limb of the knee. To one side of the upright limb of the knee is made fast the vertical rack bar D, upon which is mounted and adapted to slide up and down the dog carrying bracket or slide E. The dog is shown at F; it is as usual capable of lengthwise adjustment in the bracket, and is held in its adjusted position therein by suitable means, as for example by a spring pin on the carrier which enters the appropriate one of several notches or holes in the dog. We do not show this fastening device, however, inasmuch as it is well known, and forms no part of our improvement.

G is the lever carrier—in this instance of yoke or reversed U form, hung at its upper end on a pivot pin $a$ having its bearings in ears $b$ on the carrier. Between the legs of the yoke is pivoted the lever H by a cross pin $c$ extending between and supported in the legs of the yoke. The short end of the lever—the end next to the rack bar—has a single tooth $d$ formed by rounding and reducing that end in diameter. And for the purpose of making provision for the engagement of such a tooth with the rack bar, the latter can conveniently have a series of holes $e$ formed in it at suitable distances apart into which the tooth $d$ can be entered as shown in Fig. 1. Manifestly, however, if desired the rack bar may have raised teeth, and the lever on its inner end may have one or more teeth to engage therewith. But we much prefer the arrangement illustrated on the score of efficiency, simplicity, and economy. Under this arrangement the lever has a proper vibratory movement of its own independent of its swinging carrier, while both carrier and lever can swing together to and from the rack bar. This arrangement gives a wide and varied range of movement to the lever and permits it to be most efficiently and conveniently used for the purpose of properly setting and forcing the dog into the material.

In order to hold the dog carrying bracket in the adjusted position we make use of a set screw $f$ provided with a handle $h$, by a very slight movement of which the bracket can be clamped to or released from the rack bar.

The dog carrying bracket is manipulated by taking the set screw handle in one hand and the lever in the other hand. Under these circumstances the bracket can be quickly moved up and down, the dog can be quickly set and the bracket after the dog has been set, can at once be fastened in its adjusted position.

Having described our improvement and the best way known to us of carrying the same into effect what we claim herein as new and of our own invention is as follows:

1. The combination of the head block, the rack bar, the vertically movable dog-carrying bracket, the swinging lever-carrier pivoted to the bracket, and the rack-engaging lever pivoted to the carrier, substantially as and for the purposes hereinbefore set forth.

2. The combination with the head block and the vertically movable dog-carrying bracket of the swinging lever-carrier pivoted to the bracket, the lever hung or pivoted in the free end of said carrier, and having a single tooth, and the rack bar formed with a series of holes to receive said tooth, substantially as and for the purposes hereinbefore set forth.

3. The combination with the head block dog-carrying bracket and rack bar, of the pivoted lever, its swinging carrier and the set screw and its handle for securing the bracket in adjusted position, both handle and lever projecting from the same side or face of the bracket, as and for the purposes hereinbefore set forth.

In testimony whereof we affix our signatures in presence of two witnesses.

JAMES N. RICHEY.
SAMUEL N. HENCH.
WALKER A. DROMGOLD.

Witnesses:
JACOB E. WEAVER,
ROBERT J. LEWIS.